March 19, 1935.  H. W. WOLCOTT  1,994,553
PLANT CONTAINER
Filed Feb. 10, 1933
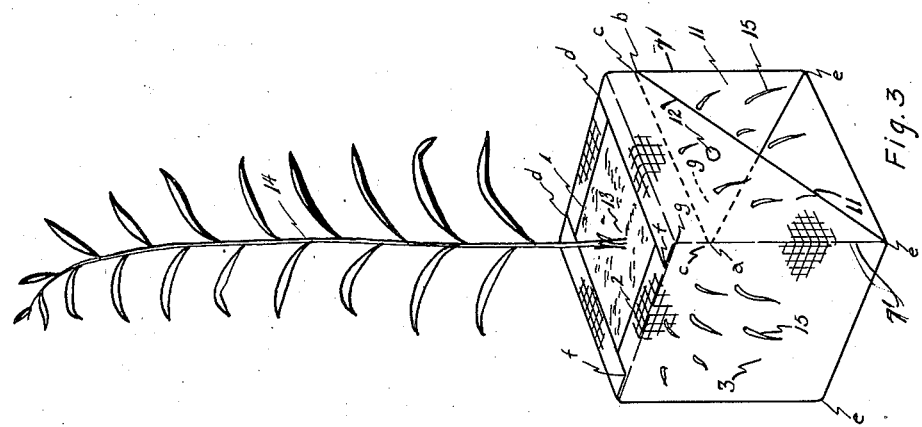
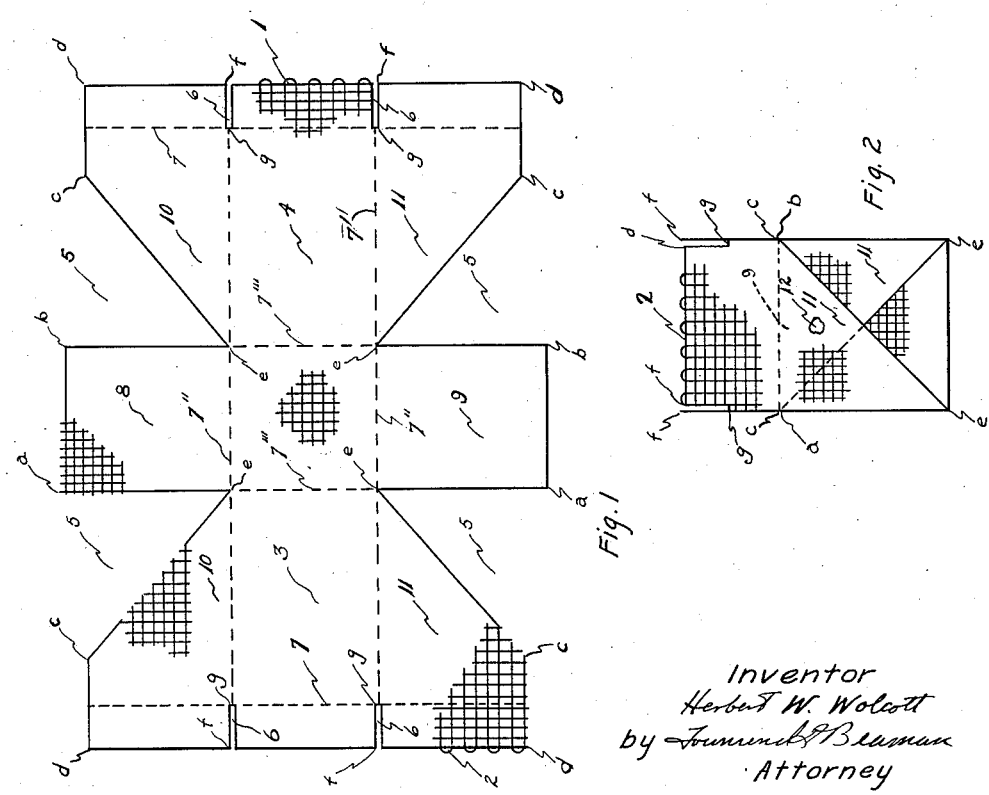
Inventor
Herbert W. Wolcott
by
Attorney Patented Mar. 19, 1935

1,994,553

UNITED STATES PATENT OFFICE 1,994,553

PLANT CONTAINER

Herbert W. Wolcott, Jackson, Mich.

Application February 10, 1933, Serial No. 656,088

3 Claims. (Cl. 47—37)

The present invention relates to plant containers and has particular reference to containers for the transporting and transplanting of delicate plants.

Herebefore pots or containers have been developed for the transportation and transplanting of plants which could be placed directly in the soil without disturbing the root structure and would slowly decompose as the plant grew. Pots of molded peat have been employed for this purpose but for the most part have been unsatisfactory as not affording sufficient drainage and aeration. Also, paper pots and pots of soluble material have found limited use for this purpose. However, all developments up to the present invention have been objectionable as not affording proper aeration and drainage or if containing these characteristics have not been of sufficient structural strength to withstand the handling involved in the growing, marketing transporting and transplanting of the plant.

It becomes the object of my invention to provide a plant container of light relatively finely woven wire screening, characterized by its ability to readily decompose in the soil and to be molded about the plant structure and soil within the container to retain the same therein.

A further object of my invention is to provide an inexpensive container which may be shipped and stored in a compact state and readily assembled by the user, yet has sufficient strength to meet all requirements and provides all the necessary plant drainage and aeration.

These and other objects and advantages will appear as the description progresses. However, it is to be strictly understood that I do not care to limit myself to the exact details herein set forth, but desire to include as part of my invention all such changes and modifications as would occur to the skilled artisan and fall within the scope of the appended claims.

In the drawing wherein a preferred form of my invention is shown for the purpose of illustration, Fig. 1 is a plan view of the wire blank from which my improved container is fabricated.

Fig. 2 is a side elevation of the container assembled but prior to insertion of plant and soil and molding of the edges thereabout.

Fig. 3 is a perspective view of the container with the upper edges molded upon the plant structure and soil.

In carrying my invention into practice my improved container is preferably fabricated from uncoated woven iron wire screening. Without limiting my invention to other than a light wire screening, twelve meshes to the running inch has proven very satisfactory. As shown in the drawing the wire screening from which the blanks are cut is preferably provided with selvage edges 1—2. Winged portions 3—4 are provided by the removal of triangular portions 5. The portions 3—4 are cut at 6 to enable the edges of the blank adjacent the selvage to be readily folded inwardly upon the soil in the container as will be hereinafter described.

If desired, during the fabrication, the blank may be slightly grooved along the lines 7—7'—7''—7''' to assist in the folding and deflection of the blank along the lines during the assembling of the container. To provide only finished selvage edges at the top of the container, the section defined between the points a—b and e—e is preferably of less overall length than the section defined between the points g—g and e—e. The points c, d and f on the blank in Fig. 1 are indicated to show the location of these points on the finished container.

The blank shown in Fig. 1 is adapted to be shipped to the user in a compact state and stored until ready for use. To assemble the container, the edges of the winged portions 3—4 and the intermediate sections 8—9 are deflected through 90° along the lines 7'' and 7'''. The wings 3—4 are then deflected inwardly through 90° along the line 7' with the portions 10—11 superimposed outside of the sections 8—9. The container is then retained assembled by securing the sections 8 and 10, and 9 and 11 together by any suitable fastening means such as by solder 12; rivet, spot welding, pins and the like can likewise be advantageously employed.

In Fig. 3 the container is shown filled with soil 13 in which a plant 14 is growing with roots 15 projecting out through certain of the meshes. As shown, the marginal edges are severed at the corners and have been deflected inwardly along the lines 7' to overlap the soil 13 and assist to retain the same together with the plant structure within the container.

A young plant growing in my improved container may be readily transported and handled and then transplanted bodily in the soil. As the wire screening is preferably uncoated, oxidation results in the rapid decomposition of the container with the result that the growth of the plant is unrestricted. Furthermore, such decomposition results in the addition of beneficial plant food to the soil.

Although reference has been repeatedly made to an uncoated screening, it is merely to define over a screening which has been treated to retard oxidation. I consider the treatment of the screening to increase oxidation within the soil within the scope of my invention. Furthermore, such treatment for increasing oxidation may be rendered still more beneficial if it is of a character imparting further plant food to the soil of decomposition. For example, a mixture of nitrate of soda and casein may be first applied to the container followed with a coating of formaldehyde. The latter coating will harden the casein and at the same time will pass off first in the soil to check any fungoid growth. The rate of oxidation of the container should be regulated depending upon the growth of the plant. Slow growing plants require the protection of the container a longer period, especially if they are subject to attacks by parasites through the soil.

As herebefore stated my container is especially adapted to be buried bodily in the soil. However, it is at once obvious that its outstanding characteristics, namely, ample aeration and drainage and the ability to be molded upon the soil contained therein, makes it useful for merely growing and handling delicate plants. In such a capacity it may be desirable to coat the wire screening from which my container is fabricated to retard oxidation.

Having described my invention, what I claim as new and desire to protect by Letters Patent is:

1. A plant container for transporting and transplanting composed of relatively light fine wire mesh screening, said screening being characterized by its ability to be readily molded about the soil and plant structure contained therein as well as its ability to readily decompose in the soil.

2. A plant container for transporting and transplanting of wire mesh screening, comprising a bottom portion, side portions terminating in edge portions, said edge portions being severed at spaced points to enable the same to be readily deflected inwardly to provide a turned flange for retaining the soil and plant structure within the container.

3. A plant container fabricated from wire mesh screening comprising a bottom, integral winged portions on opposite sides of said bottom and integral side portions, said side portions being folded upwardly in one direction and said winged portions being folded upwardly and inwardly, the inwardly folded portions overlapping said side portions, the outer edges of said winged portions constituting the upper edge of said container being selvaged and adapted to be deflected inwardly upon the plant structure and soil.

HERBERT W. WOLCOTT.